(12) United States Patent  
Jourdan et al.

(10) Patent No.: US 7,155,599 B2
(45) Date of Patent: Dec. 26, 2006

(54) METHOD AND APPARATUS FOR A REGISTER RENAMING STRUCTURE

(75) Inventors: Stephan J. Jourdan, Portland, OR (US); Michael Bekerman, Campbell, CA (US); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 468 days.

(21) Appl. No.: 09/750,095

(22) Filed: Dec. 29, 2000

(65) Prior Publication Data

US 2002/0087836 A1 Jul. 4, 2002

(51) Int. Cl.
G06F 9/40 (2006.01)
(52) U.S. Cl. .................................................. 712/227
(58) Field of Classification Search ................. 712/217
See application file for complete search history.

(56) References Cited

U.S. PATENT DOCUMENTS 5,758,112 A * 5/1998 Yeager et al. ............... 712/217

OTHER PUBLICATIONS

Wallace, S et al., A scalable register file architecture for dynamically scheduled processors, Proceedings of the 1996 Conference on Parallel Architectures and Compilation Techniques, Oct. 1996, pp. 179-184.*
Yeager, Kenneth C., The Mips R10000 superscalar microprocessor, IEEE Micro, Apr. 1996, v. 16, I. 2, pp. 28-41.*
Moudgill, M. et al., Register renaming and dynamic speculation: an alternative approach, Proceedings of the 26th Annual International Symposium on Microarchitecture, Dec. 1-3, 1993, pp. 202-213.*

* cited by examiner

Primary Examiner—Richard L. Ellis
(74) Attorney, Agent, or Firm—Kenyon & Kenyon LLP (57) ABSTRACT

A processor having a register renaming structure and method is disclosed to recover a free list. The processor includes a physical register file including physical registers. The processor also includes a decoder to decode an instruction to indicate a destination logical register. The processor also includes a register allocation table to map the destination logical register to an allocated physical register. The processor also includes an active list that includes an old field and a new field. The old field includes at least one evicted physical register from the register alias table. The new field includes the allocated physical register. The processor also includes the free list of unallocated physical registers reclaimed from the active list.

15 Claims, 6 Drawing Sheets

METHOD AND APPARATUS FOR A REGISTER RENAMING STRUCTURE

TECHNICAL FIELD

The present invention relates to executing instructions in a processor. More particularly, the present invention relates to reclaiming physical registers in a register renaming structure for out-of-order instruction execution.

BACKGROUND OF THE INVENTION

Most instructions in a computer instruction set operate on several source operands to generate results. The instructions name, either explicitly or through an indirection, the source and destination locations where values are read from or written to. A name may be either a logical, or an architectural, register or a location in memory.

Instructions involving register operands are faster than those involving memory operands. For some microprocessor architectures, instructions naming memory operands are translated, or decoded, into microinstructions that transfer operand values from memory to logical registers and then perform the decoded computations. The number of logical registers often is limited, compilers efficiently should utilize logical registers to generate efficient code.

The number of physical registers available in a microprocessor typically exceeds the number of logical, or architectural, registers, so that register renaming may be utilized to increase performance. More than one physical register may be renamed to a logical register. Each physical register may correlate to a non-retired instruction, and, therefore, a plurality of non-retired instructions should utilize a plurality of physical registers. In particular, for out-of-order processors, register renaming allows instructions to be executed out of their original program order. Thus, for many out-of-order processors, an instruction is renamed so that logical registers named in the original instruction are renamed to physical registers.

Renaming a logical register involves mapping a logical register to a physical register. These mappings are stored in a Register Alias Table ("RAT"). A RAT maintains the latest mapping for each logical register. A RAT is indexed by logical registers, and provides mappings to corresponding physical registers. This activity may be called dependency tracking.

Figure 1:
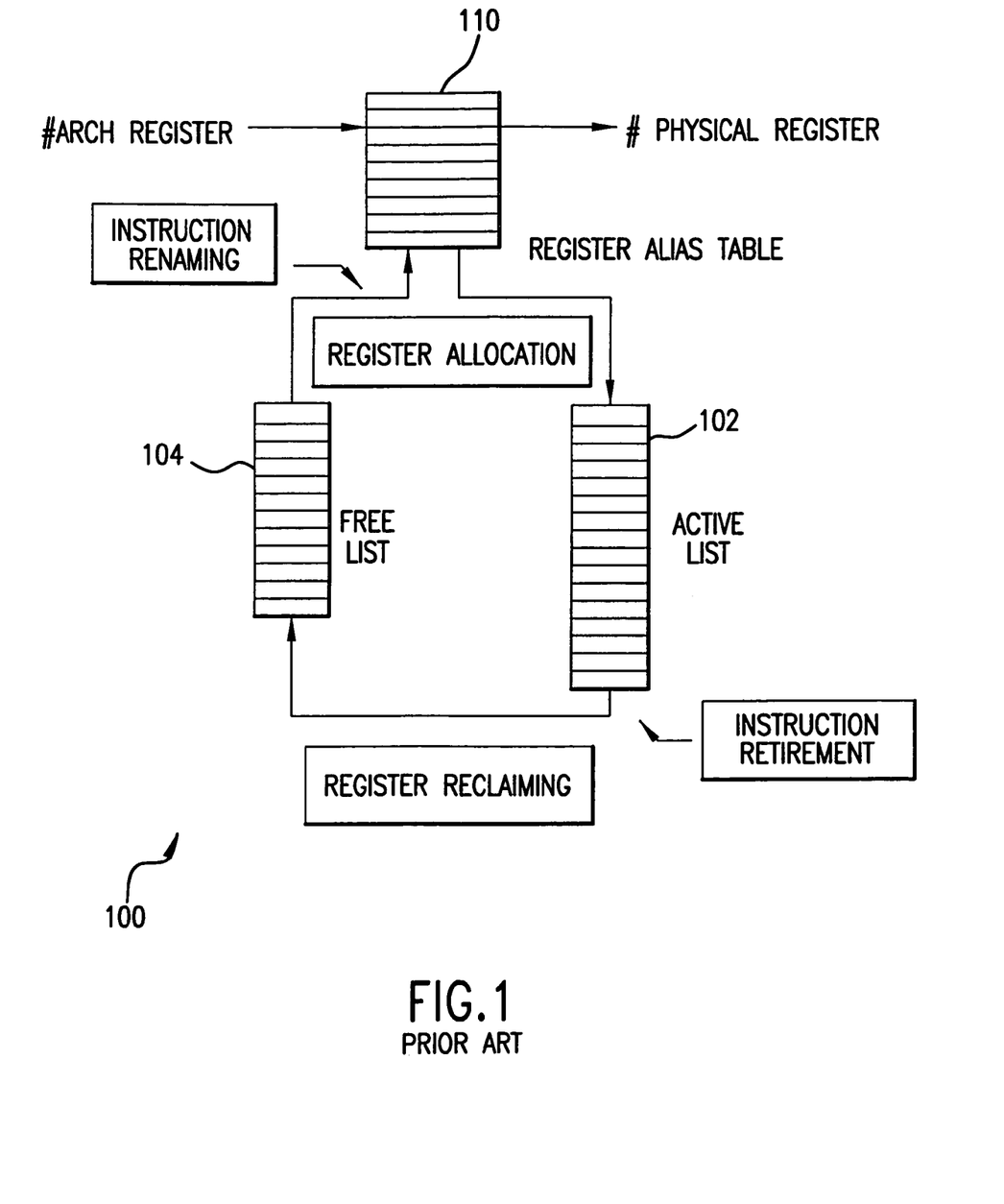
FIG. 1 illustrates a register renaming structure for a processor.

FIG. 1 depicts a register renaming and dependency tracking scheme involving three structures: a RAT 110, a active list 102, and a free list 104. For each logical register specified by a renamed instruction, an unused physical register from the free list 104 is allocated. RAT 110 is updated with this new allocation. Physical registers are free to be used again, or reclaimed, once they cannot be referenced by instructions in the current instruction window.

Based upon the data structures depicted in FIG. 1, one method for register reclaiming is to reclaim a physical register when the instruction that evicted it from RAT 110 retires. Thus, the instruction that created the new allocation to the physical register is retired for reclaiming to occur. As a result, whenever a new allocation updates RAT 110, the evicted old allocation is pushed into active list 102. An active list 102 entry is associated with each instruction in the instruction window. When an instruction retires, the physical register evicted from RAT 110 and recorded in active list 102, if any, is reclaimed and pushed into free list 104. The cycle is depicted in FIG. 1.

During register renaming, free list 104 allocates an unused physical register when an instruction specifies a logical, or architectural, register as a destination. The instruction source physical registers are read from RAT 110 based on the instruction source logical registers. Afterwards, RAT 110 maps the destination logical register to the newly allocated physical register from free list 104. When a destination logical register is renamed, subsequent instructions cannot read the physical register that previously was mapped to that logical register. As discussed above, an appropriate condition for register reclaiming is to reclaim a physical register when the instruction that generated the new mapping in RAT 110 retires. Further, the old mapping is pushed into active list 102 from RAT 110. When the corresponding instruction retires, the old mapping is reclaimed and pushed into free list 104.

Figure 2:
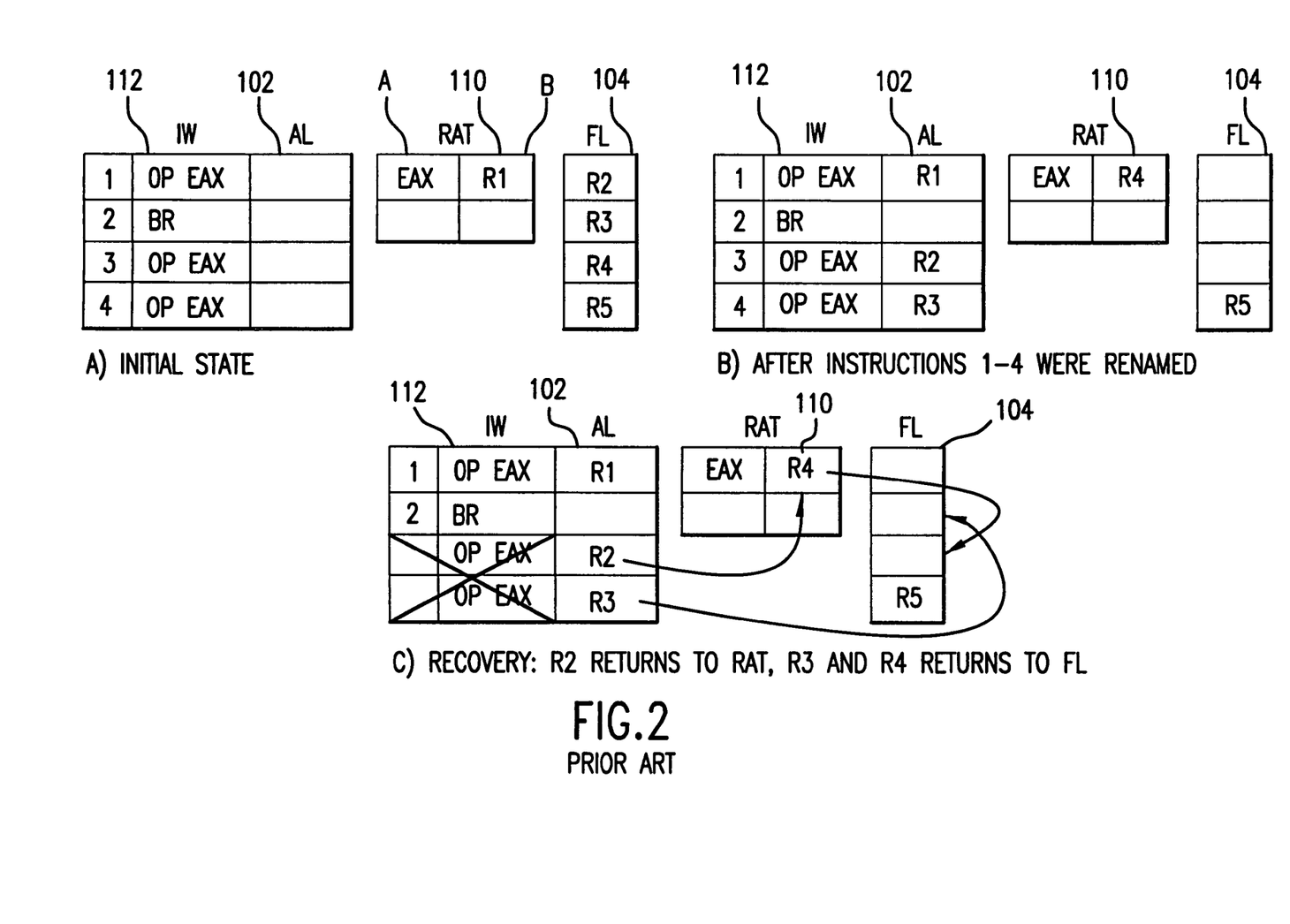
FIGS. 2a–c illustrate an example of a recovery scheme for a processor.

FIG. 2 depicts an example of a recovery scheme for the register renaming structure. The renaming structures described in FIG. 1 are repaired when an exception occurs in the processor. Recovery techniques seek to restore the correct state to RAT 110, active list 102 and free list 104. Several events may terminate a normal instruction flow. Common reasons for exceptions include mispredicted branches, interupts, or exceptions. When these events occur, instruction window buffer 112 should be flushed after the point of the exception. In addition, all three structures involved in register renaming should be repaired to reflect the new logical, or architectural state.

FIG. 2a depicts the original state of the processor. Instruction window 110 holds four instructions that have not been renamed. Instructions 1, 3 and 4 specify logical register EAX as their destinations. Active list 102 is empty. The current mapping of logical register EAX is physical register R1. Free list 104 contains unallocated registers R2 to R5.

FIG. 2b depicts that state of the renaming structures after all four instructions are renamed. Each allocation of a new physical register for EAX pushed the previous mapping into active list 102. The current mapping of EAX in RAT 110 is physical register R4. Physical registers R1, R2 and R3 correlate to old mappings evicted from RAT 110. Free list 104 contains unallocated physical register R5.

If the branch instruction of instruction 2 in instruction window buffer 112 is mispredicted, then all three remaining structures need to be repaired so they reflect the state of the machine right L5 after instruction 2. One method to recover RAT 110 is to establish checkpoints of its content for every dispatched branch. RAT 110 can be recovered by copying the content of the corresponding checkpoint into RAT 110. Active list 102 may be repaired by flushing all entries past the mispredicted branch, or instructions 3 and 4 in the example. FIG. 2c depicts a complex algorithm to recover free list 104. Part of the physical registers in RAT 110 and active list 102 are returned to free list 104. Algorithms may need to be implemented to recover the physical registers to free list 104. Merely recovering flushed entries may lead to physical registers being recovered incorrectly. Thus, a need has arisen for a method for recovering free list 104 in a more efficient manner.

DETAILED DESCRIPTION

An embodiment of the present invention is directed to a processor having a register renaming structure to recover a free list. The processor may include a physical register file having physical registers. The processor also may include a decoder to decode an instruction indicating a destination logical register. The processor also includes a register allocation table to map the destination logical register to an allocated physical register. The processor also includes an active list that includes an old field and a new field. The old field includes at least one evicted physical register from the register alias table. The new field includes the allocated physical register. The processor also includes the free list of unallocated registers reclaimed from the active list.

Figure 3:
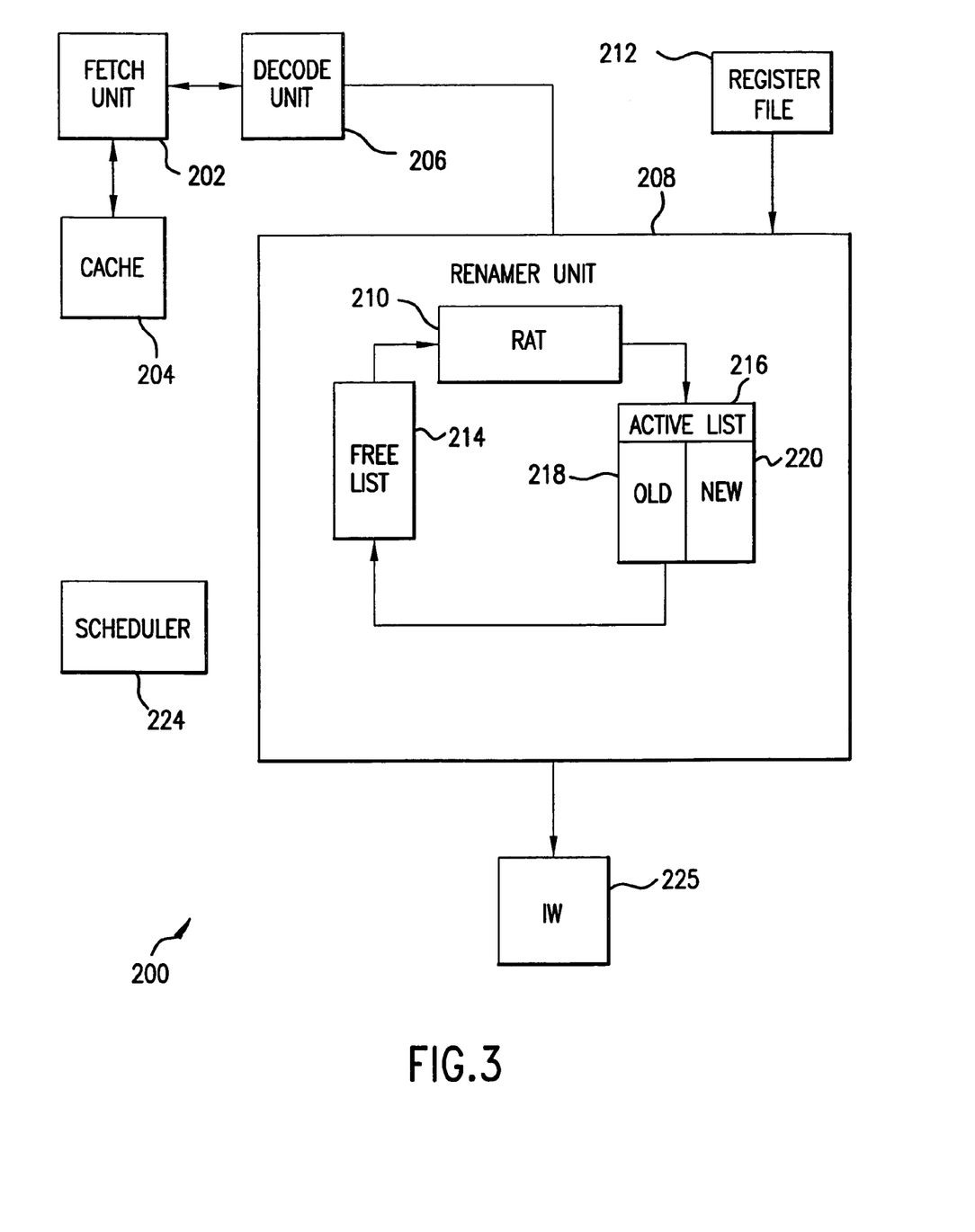
FIG. 3 illustrates a block diagram of a processor in accordance with an embodiment of the present invention.

FIG. 3 is a block diagram of a processor 200 in accordance with an embodiment of the present invention. Processor 200 may be an out-of-order processor. For simplicity, not all functional units of processor 200 are depicted. In processor 200, fetch unit 202 fetches instructions from instruction cache 204, and decode unit 206 decodes these instructions. For a Complex Instruction Set Computer ("CISC") architecture, decode unit 206 decodes a complex instruction into one or more micro-instructions. The micro-instructions may define a load-store type architecture, so that micro-instructions involving memory operations are simple load or store instructions. The present invention, however, may be practiced for other architectures, such as Reduced Instruction Set Computer ("RISC"), Very Large Instruction Word ("VLIW") architectures, and the like.

For a RISC architecture, instructions are not decoded into micro-instructions. Because the present invention may be practiced for RISC architectures as well as CISC architectures, we shall not make a distinction between instructions and micro-instructions unless otherwise stated, and will refer simply to these as "instructions".

A register renaming functional unit 208 may include register allocation table ("RAT") 210. RAT 210 contains current mappings between logical registers and physical registers. The physical registers are indicated by physical register file 212. The decoded instructions may indicate the logical, or architectural, registers to be utilized by the instruction. Every logical register should have a mapping to a physical register in physical register file 212. As noted above, more than one physical register may be mapped to a logical register. This number may be dependent upon the number of non-retired instructions. Some physicals registers in physical register file 212 may be dedicated for integers whereas others may be dedicated for floating point numbers, but for simplicity, these distinctions are not made.

During renaming of an instruction, current entries in RAT 210 may provide the required mapping, or mappings, for renaming the source logical register, or registers, of the instruction, and a new mapping is created for the destination logical register of the instruction. The new mapping may evict the old mapping in RAT 210, and RAT 210 is updated with this new mapping.

Renamed instructions are placed in instruction window buffer 226. Entries in instruction window buffer 226 contain the opcode of the renamed instruction, as well as other fields. The results of the instructions, however, may not be stored in instruction window 226 but may reside in physical register file 212. Instruction window buffer 226 may allow for instruction retirement in original program order. Instruction window buffer 226 may operate as a circular buffer, where a first pointer points to the next instruction to be retired and a second pointer points to the next available entry for a newly decoded instruction. When an instruction retires, the first pointer is incremented. When a decoded instruction is placed in instruction window buffer 226, the second pointer is incremented. The pointers are incremented by one for each decoded instruction in a RISC architecture, and may be incremented by more than one for CISC architectures.

According to embodiments of the present invention, instruction window buffer 226 may have pointer fields for pointing to physical registers. When an instruction placed in instruction window buffer 226 has evicted a mapping in RAT 210, a pointer field associated with the instruction is set to point to the physical register of the evicted mapping. The pointer fields comprise an active list 216. Active list 216 includes old field 218 and new field 220. Free list 214 may be a queue of pointers pointing to unallocated physical registers. Free list 214 also may reclaim allocated registers from active list 216 as they become available.

Active list 216 may have two fields. Old field 218 stores the evicted registers from RAT 210. This process is similar to active list 102 depicted in FIG. 1. New field 220 stores, for each entry, the physical register newly allocated in RAT 210. Thus, active list 216 may record the allocated physical register from free list 214 for each instruction. Upon a misprediction or other exception within processor 200, free list 214 may be repaired by pushing back all physical registers pointed by new field 220 of all instructions past the mispredicted branch. Thus, in addition to active list 216 having evicted physical registers in old field 218, active list 216 also has the newly allocated physical registers in new field 220. Therefore, free list 214 may reclaim registers from active list 216 without algorithms or indirect processes executed at a misprediction condition.

Figure 4:
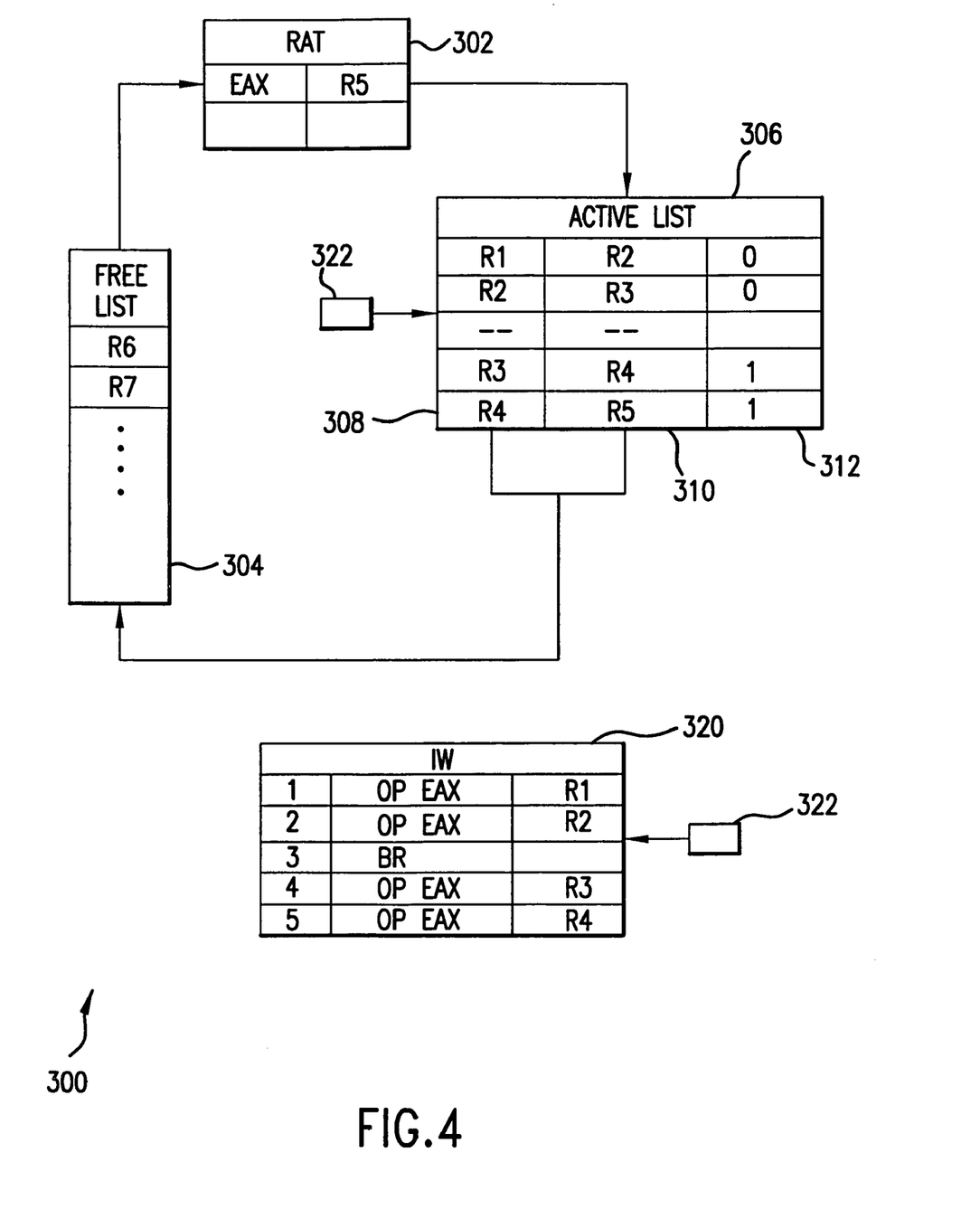
FIG. 4 illustrates a block diagram of a register renaming structure in accordance with an embodiment of the present invention.

FIG. 4 depicts an example of a register renaming structure 300 in accordance with an embodiment of the present invention. Register renaming structure 300 may be analogous to renaming structure 208 depicted in FIG. 3. RAT 302 has a current mapping of logical register EAX to physical register R5. Instruction window buffer 320 illustrates five instructions that have been renamed. Active list 306 includes old field 308, new field 310 and bit field 312. Free list 304 indicates that physical registers R6 and R7 are unallocated. In instruction window buffer 320 indicates that instructions 1, 2, 4 and 5 specify logical register EAX as their destination.

Each allocation of a new physical register for logical register EAX may push the previous mapping by RAT 302 into active list 306, and stored in old field 308. New field 310 indicates the newly allocated physical register by RAT 302 for each instruction. Because instruction 3 is a branch, a physical register should not be allocated by RAT 302. Thus, active list 306 should not store any physical register information for instruction 3. Thus, according to the embodiment depicted in FIG. 4, all five instructions have been renamed, with physical registers R1–R4 having been evicted from RAT 302, as depicted by old field 308.

New field 310 may contain the newly mapped physical register by the RAT 302 for each renamed instruction. For example, instruction 1 specifies logical register EAX as its destination physical register. RAT 302 evicts physical register R1 to old field 308 and maps logical register EAX for instruction 1 to physical register R2. This mapping is recorded in new field 310. As additional instructions are renamed, old field 308 and new field 310 record the evicted physical register and newly allocated, or mapped, physical register, respectively.

A misprediction condition may occur that impacts register renaming structure 300. For example, instruction 3 may be a branch instruction having a predicted result. If the prediction is in error, then the branch is "mispredicted" and a misprediction condition occurs. Instructions executed after the misprediction are flushed because they are incorrect. Thus, referring to instruction window buffer 320, instructions 4 and 5 are flushed and the register renaming structures placed back to their states at the misprediction.

As noted above with reference to FIG. 2, RAT 302 may have snapshots taken at each checkpoint. The snapshot then may be used to restore RAT 302 to its states prior to the branch. Other schemes may exist to perform this process. Active list 306 may be restored by flushing all entries past the misprediction. Thus, for example, entries allocated after the mispredicted branch within old field 308 and new field 310 may be flushed out of active list 306. Entries associated with instructions 3 and 4 are flushed. Free list 304 should recover those physical registers freed up by RAT 302 and active list 306. According to embodiments of the present invention, free list 304 can recover physical registers by pushing back all physical registers that are indicated in new field 310 past the misprediction condition. Physical registers R4 and R5 are to be recovered by free list 304.

According to an embodiment of the present invention, free list 304 may recover physical registers by using the normal process of reclaiming physical registers at retirement time. As noted above, physical registers indicated by old field 308 in active list 306 are reclaimed whenever an instruction retires. Embodiments of the present invention make use of the existing reclaiming mechanism by having it to work differently for a recovery after a misprediction. Retirement pointer 322, which usually points to the next instruction to retire in both the instruction window 320 and the active list 300, is moved to the first wrong instruction in instruction window buffer 320. All instructions belonging to the mispredicted path are "retired," but instead of reclaiming physical registers evicted by the associated instruction from old field 308, physical registers indicated by new field 310 are reclaimed. This procedure may be known as a "dummy" retirement and is performed for resource reclaiming. Retirement may be halted for during the dummy retirement. Dummy retirement has no effect except to recover physical registers after a misprediction condition. Because newly dispatched instructions overwrite entries associated to the mispredicted path, the dummy retirement rate should match the dispatch rate of new instructions. The recovery process may be performed without impairing performance because room in instruction window buffer 320 is created by the flushing operations caused by the misprediction condition. Thus, overriding entries on active list 306 will not impair performance of register renaming unit 300. Therefore, recovering of physical registers is performed on the evicted physical registers of old field 308 when retiring instructions, whereas recovering of physical registers is performed on the newly allocated physical registers when recovering from an exception.

According to another embodiment of the present invention, physical register recovery for free list 304 may occur during dispatch of the instructions after the register are renamed. Dispatch may be defined as the process of entering instructions in instruction window 320. This embodiment uses bit field 312 within active list 306. Bit field 312 includes bits associated with each entry of active list 306. Thus, in addition to old field 308 and new field 310, entries of active list 306 also will have a bit in bit field 312. Recovery is performed on the entry overwritten in active list 306 by the newly dispatched instruction. Active list 306 may be a circular buffer that continously overwrites entries as instructions are dispatched. If the instruction associated with the entry in active list 306 was retired correctly, then the recovery, or reclaiming, is performed based on old field 308. If the instruction associated with the entry was not retired correctly, then the recovery is performed based on new field 310. This action indicated the entry corresponded to an entry that was flushed. An example of recovering a physical register on a non-retired instruction is when the instruction has been flushed from instruction window buffer 320 after a misprediction condition.

The bits within bit field 312 correlate as to how the instruction should be treated. For example, a zero ("0") bit may indicate that the instruction was retired correctly. A one ("1") may indicate that the instruction was not retired correctly, but flushed due to a misprediction. During a misprediction condition, active list 306 may set the bits after the misprediction instruction to a value of 1. Pointer 322 is aligned at the first entry after the branch instruction, and those entries afterwards are assigned a value of 1 in the active list 306. Thus, the entries associated with flushed instructions 4 and 5 have a bit value of 1 in bit field 312. As new instructions are dispatched, they are written into active list 306. Register renaming structure 300 looks at the bit in bit field. If the value is 0, then the physical register indicated in old field 308 is reclaimed by free list 304. If the value is 1, then the physical register indicated in new field 310 is reclaimed by free list 304. For example, with regard to instruction 4, after the misprediction condition, physical register R4 would be reclaimed by free list 304. Thus, at dispatch time, the bit is set in bit field 312, and the bit is cleared when the associated instruction retires.

Figure 5:
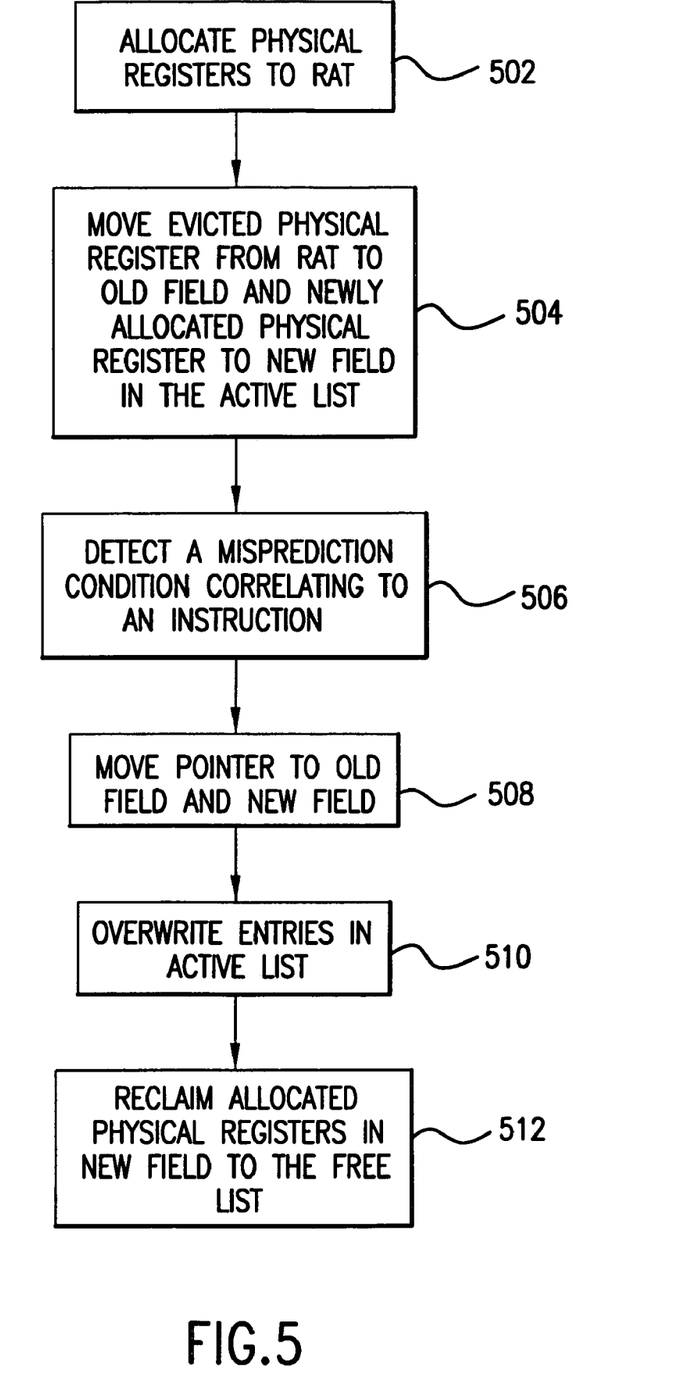
FIG. 5 illustrates a flowchart of a method for recovering registers in accordance with an embodiment of the present invention.

FIG. 5 depicts a flowchart of a method for recovering registers in a processor in accordance with an embodiment of the present invention. Embodiments of the present invention may allocate physical registers to the RAT. [Box 502] For example, referring to FIG. 4, RAT 302 may be allocated a physical register from free list 304. Embodiments of the present invention may move an evicted physical register from RAT 302 to old field 308 in active list 306. [Box 504] The newly allocated physical register may be moved to new field 310. Embodiments of the present invention may detect a misprediction condition correlating to an instruction associated with an entry on active list 304. [Box 506] A misprediction condition may be a mispredicted branch of a branch instruction. The results of the misprediction should be flushed from register renaming structure 300. Embodiments of the present invention may move pointer 322 to the next entry following the mispredicted branch. [Box 508]

Embodiments of the present invention may use register renaming structure 300 to overwrite entries in active list 306 based on the processes described above. [Box 510] Embodiments of the present invention may reclaim allocated physical registers in new field 310 to free list 304. [Box 512]

Figure 6:
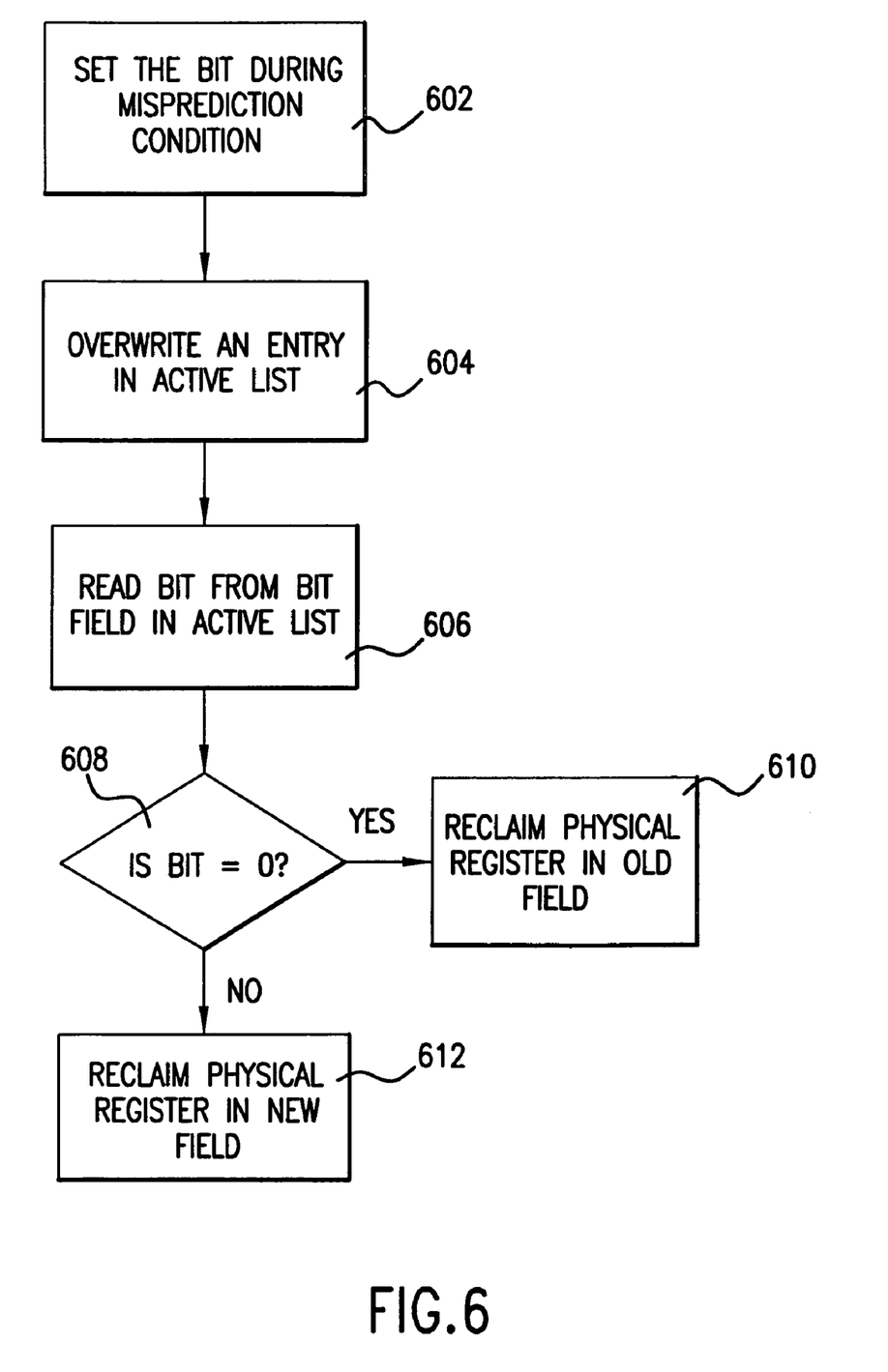
FIG. 6 illustrates a flowchart of a method for recovering registers in accordance with an embodiment of the present invention.

FIG. 6 depicts a flowchart of another method for recovering registers in a processor in accordance with another embodiment of the present intervention. Embodiments of the present invention may set a bit during a misprediction condition. [Box 602] For example, referring to FIG. 4, the bit in bit field 312 is set during a misprediction condition for entries after pointer 322, which has been moved back to the entry following the mispredicted branch. Embodiments of the present invention may overwrite an entry in active list 306, including the physical registers in old field 308 and new field 310. [Box 604] Embodiments of the present invention may read a bit in bit field 312 in active list 306 and correlating to the overwritten entry. [Box 606] Embodiments of the present invention may determine whether the bit read in step 606 is equal to 0. [Box 608] If so, then embodiments of the present invention may reclaim the physical register indicated in old field 308. [Box 610] For example, if the entries correlating to instruction 4 are overwritten and instruction 4 was retired, then physical register R3 would be reclaimed. If not, then embodiments of the present invention may reclaim the physical register in new field 310 correlating to the instruction. [Box 612] Thus, if instruction 4 was flushed as a result of a misprediction, and the bit is 1, then physical register R4 would be reclaimed.

By reclaiming physical registers from the active list to the free list, embodiments of the present invention may avoid additional logic or algorithms for reconciling misprediction conditions. Further, physical registers may be reclaimed when the registers are not correlating to an instruction that is not retired or flushed from the instruction window buffer. Thus, physical register resources may be utilized more efficiently and without increased risk.

Thus, it is apparent that there has been provided, in accordance with the embodiments of the present invention disclosed above, a method and apparatus recovering registers for a register renaming structure. Although the present invention has been disclosed in detail, it should be understood that various changes, substitutions, and alterations may be made herein. Moreover, although software and hardware are described to control certain functions, such functions can be performed using either software, hardware or a combination of software and hardware, as is well known in the art. Other examples are readily ascertainable by one skilled in the art and may be made without departing from the spirit and scope of the present invention as defined by the following claims.

What is claimed is:

1. A processor, comprising:
    a physical register file populated by a number of registers;
    an instruction decoder;
    a register alias table coupled to the instruction decoder;
    an active list populated by a number of entries, the entries include an old field and a new field;
    a free list of unallocated physical registers reclaimed from said active list; and
    a misprediction condition wherein said free list reclaims mispredicted allocated said physical registers from said new field.

2. The processor of claim 1, further comprising an instruction window buffer to store dispatched instructions.

3. The processor of claim 2, wherein said dispatched instructions correlate to evicted allocated physical registers, said free list is to reclaim said evicted physical registers when said dispatched instructions retire.

4. The processor of claim 1, wherein said instruction is to write to said allocated physical register.

5. The processor of claim 1, wherein said allocated physical register is to be allocated from said free list.

6. The processor of claim 1, further comprising a bit field within said active list, said bit field comprising at least one bit to indicate whether the instruction is retired correctly.

7. A method for recovering registers in a processor, comprising:
    detecting an exception correlating to an instruction associated with an entry on an active list;
    moving a pointer on said active list to an old field and a new field after said entry; and
    reclaiming during a misprediction condition allocated physical registers in said new field to a free list.

8. The method of claim 7, further comprising flushing instructions in an instruction window buffer after said instruction associated with a misprediction condition.

9. The method of claim 8, further comprising overwriting entries in said active list.

10. The method of claim 7, further comprising allocating unallocated physical registers from said free list to a register alias table.

11. The method of claim 10, further comprising moving evicted physical registers from said register alias table to said active list.

12. A register renaming apparatus within a processor, comprising:
    a register alias table;
    a first set of registers to be renamed by said register alias table;
    an active list having an old field and a new field that correlate to said registers; and
    a free list comprising a second set of registers reclaimed from said active list; and
    a misprediction condition wherein said free list is to reclaim mispredicted allocated said registers from said new field.

13. The apparatus of claim 12, wherein said first set of registers correlate to non-retired instructions.

14. The apparatus of claim 12, wherein said active list includes a bit field.

15. The apparatus of claim 12, further comprising a pointer for said active list.

* * * * *